United States Patent
Oedl

(10) Patent No.: US 7,752,961 B2
(45) Date of Patent: Jul. 13, 2010

(54) DEVICE AND METHOD FOR DRIVING A PREHEATING ROLL ASSEMBLY IN A CALENDER UNIT

(75) Inventor: Günter Oedl, Salzburg (AT)

(73) Assignee: Bruckner Maschinenbau GmbH, Siegsdorf (DE)

( * ) Notice: Subject to any disclaimer, the term of this patent is extended or adjusted under 35 U.S.C. 154(b) by 284 days.

(21) Appl. No.: 11/791,830

(22) PCT Filed: Nov. 10, 2005

(86) PCT No.: PCT/EP2005/012064

§ 371 (c)(1),
(2), (4) Date: May 30, 2007

(87) PCT Pub. No.: WO2006/063641

PCT Pub. Date: Jun. 22, 2006

(65) Prior Publication Data

US 2008/0023866 A1    Jan. 31, 2008

(30) Foreign Application Priority Data

Dec. 16, 2004 (DE) .................. 20 2004 019 456 U

(51) Int. Cl.
*B30B 3/04* (2006.01)
*B29C 43/46* (2006.01)

(52) U.S. Cl. .................. 100/172; 100/331; 100/161; 425/143

(58) Field of Classification Search .................. 100/47, 100/161, 164, 168, 172, 329, 331, 334, 143; 425/367, 404

See application file for complete search history.

(56) References Cited

U.S. PATENT DOCUMENTS

| 4,017,251 | A | * | 4/1977 | Coburn et al. | ................ 425/404 |
| 4,736,580 | A | * | 4/1988 | Wolf | ............................ 57/100 |
| 5,151,024 | A | | 9/1992 | Hayashi | |
| 6,854,592 | B2 | * | 2/2005 | Fukuoka | ..................... 198/788 |
| 2001/0012548 | A1 | | 8/2001 | Coburn | |

FOREIGN PATENT DOCUMENTS

| DE | 20 55 456 | 5/1972 |
| DE | 24 53 443 | 5/1976 |
| DE | 29 31 198 | 2/1981 |
| DE | 30 26 129 | 2/1982 |
| DE | 40 14 608 | 11/1991 |

(Continued)

OTHER PUBLICATIONS

International Search Report for PCT/EP2005/012064 mailed Mar. 10, 2006 (English and German).

*Primary Examiner*—Jimmy T Nguyen
(74) *Attorney, Agent, or Firm*—Nixon & Vanderhye P.C.

(57) ABSTRACT

A device drives a preheating roll assembly comprising several rolls, during a heating or preheating stage. A motor assembly includes at least one individual drive and preferably two individual drives, which are used to drive at least the exit roll and preferably the entry roll and the exit roll. The motor assembly also includes one or more asynchronous motors, each asynchronous motor controlling the surface speed and the torque of one of the intermediate rolls. A common frequency converter operates one or more asynchronous motors, in particular all asynchronous motors.

11 Claims, 4 Drawing Sheets

FOREIGN PATENT DOCUMENTS

| | | |
|---|---|---|
| DE | 196 22 085 | 12/1997 |
| DE | 103 39 733 | 11/2004 |
| EP | 0 442 253 | 4/1995 |
| EP | 0 875 359 | 11/1998 |
| WO | 97/46368 | 12/1997 |

* cited by examiner

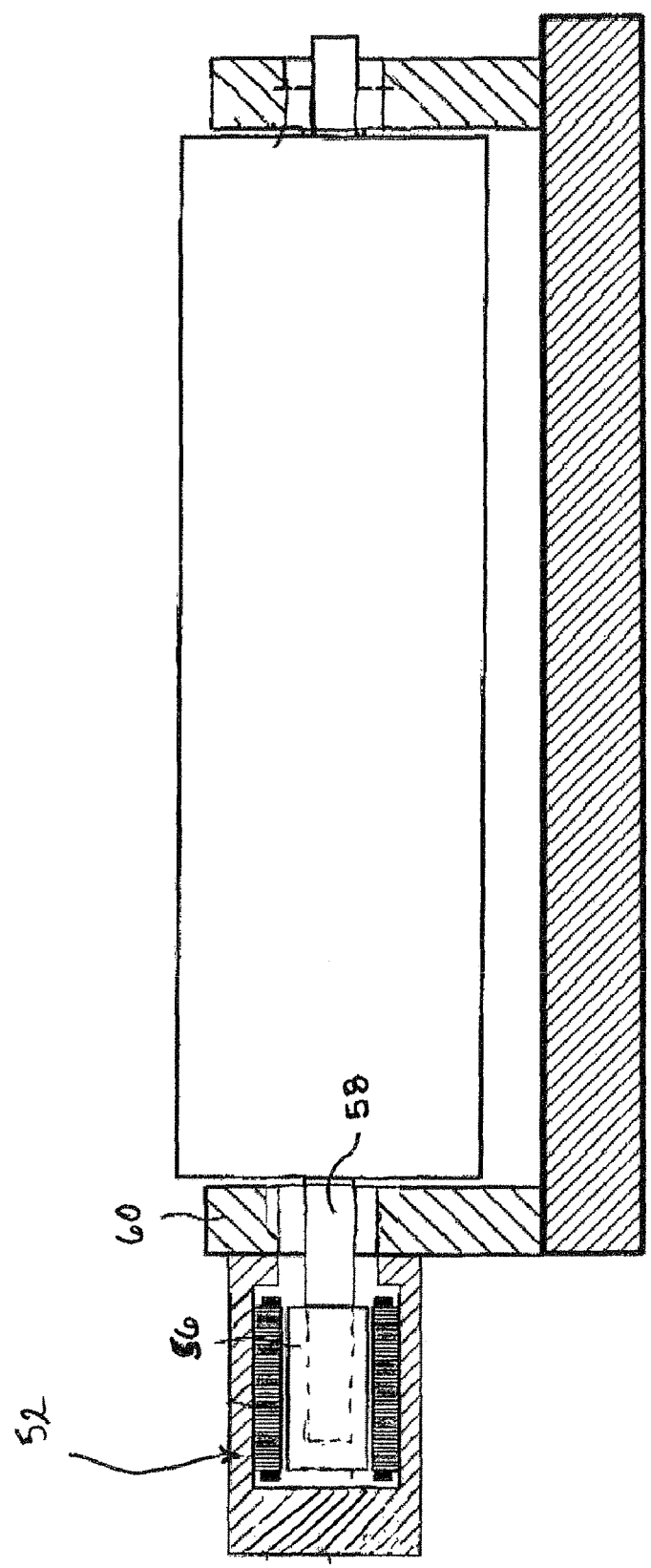

DEVICE AND METHOD FOR DRIVING A PREHEATING ROLL ASSEMBLY IN A CALENDER UNIT

This application is the U.S. national phase of International Application No. PCT/EP2005/012064 filed 10 Nov. 2005, which designated the U.S. and claims priority to DE 20 2004 019 456.2 filed 16 Dec. 2004, the entire contents of each of which are hereby incorporated by reference.

BACKGROUND OF THE INVENTION

The invention relates to a device for driving a preheating roll assembly in a unit for producing films and to an associated method for the operation thereof.

When producing plastics films the screen film issuing from an extruder is usually first of all cooled via a chilling roll rotating in a water bath. Using what is known as a preheating roll assembly the film is again heated to a temperature which allows subsequent stretching of the film.

Heating of the film, which is desired in terms of process-engineering, by preheating rolls leads to a change in length which in turn requires speed graduation of the preheating rolls. According to the prior art this is achieved in that the individual rolls are driven by a common motor via belts. In this connection, each roll comprises a belt pulley over which a belt runs that is driven by the common motor. Speed graduation of the rolls is attained by appropriate graduation of the diameters of the belt pulleys. One drawback in this connection is that the graduation, once selected, corresponds to only one heating profile. A different graduation of the belt pulleys is required in the case of other process parameters since otherwise excessive stresses in the film (lead too high) or a slackening of the film (delay) would occur. To change the graduation of the belt pulleys they have to be replaced, and this is linked to very high expenditure.

To solve this problem an individual drive could be associated with each preheating roll. While the applicable rotational speed can be correctly adjusted in any operating case on the individual rolls hereby, a separate motor with sensor and converter have to be provided for each preheating roll for this purpose. The adjustment of the individual motors for each operating case is also very laborious.

Document DE 30 26 129 A1 describes a metal strip stretching unit with a plurality of pulling and retaining rolls, it being possible for some of the rolls to be decoupled from a common main drive motor.

SUMMARY OF THE INVENTION

The object of the present invention is to create a drive device for a preheating roll assembly, which operates reliably and may be easily adjusted to different process parameters, and to an associated method for the operation thereof.

In contrast to the known devices the drive device according to the invention comprises at least one individual drive and in particular two individual drives, namely for an entry roll and an exit roll, all, or at least half, of the intermediate rolls located between the entry and exit rolls having one asynchronous motor respectively. Each asynchronous motor controls the surface speed and the torque of an intermediate roll, one or more than one asynchronous motor(s), in particular all asynchronous motors, being operated via a common frequency converter.

The common frequency converter of the asynchronous motors can easily adjust the intermediate rolls by appropriate selection of the converter frequency to different process parameters, in particular to different temperature profiles and different conveying speeds of the film. Individual belt pulleys on the preheating rolls no longer have to be replaced when the process parameters change, as is the case with the known preheating roll assemblies. Furthermore, the use of individual drives with corresponding sensors and converters for each preheating roll may be omitted.

In a preferred embodiment of the invention the frequency of the common frequency converter is adjusted such that for a predefined temperature profile of the preheating roll assembly and a desired conveying speed of the film the friction of the preheating rolls and elongation of the film are compensated in the preheating roll assembly. The asynchronous motors thus assume the task of compensating the friction in the bearings and feed heads of the individual intermediate rolls and compensating the elongation of the film.

In a preferred embodiment of the invention the individual drives are two direct drives, one direct drive driving the entry roll and the other direct drive driving the exit roll.

In a further embodiment of the invention the asynchronous motors are at least partially torque motors with a hollow shaft. These torque motors are preferably directly assembled on the roll shaft of the intermediate rolls. The asynchronous motors can, however, at least partially also be IEC standard motors (IEC=International Electrochemical Commission). In this case the asynchronous motors are preferably assembled on the roll shaft via a flange and/or a bracket.

To compensate the elongation of the film, in a preferred embodiment of the invention, the exit roll can rotate at a higher surface speed during operation than the entry roll.

In addition to the drive just described, the invention also relates to a preheating roll assembly comprising a drive of this type. The invention also relates to a device for producing film, which comprises a preheating roll assembly with the drive according to the invention.

BRIEF DESCRIPTION OF THE DRAWINGS

Embodiments of the invention will be described in detail hereinafter with reference to the accompanying figures, in which:

FIG. 1A shows a schematic reproduction of an exemplary roll.

DETAILED DESCRIPTION OF THE INVENTION

Figure 1:
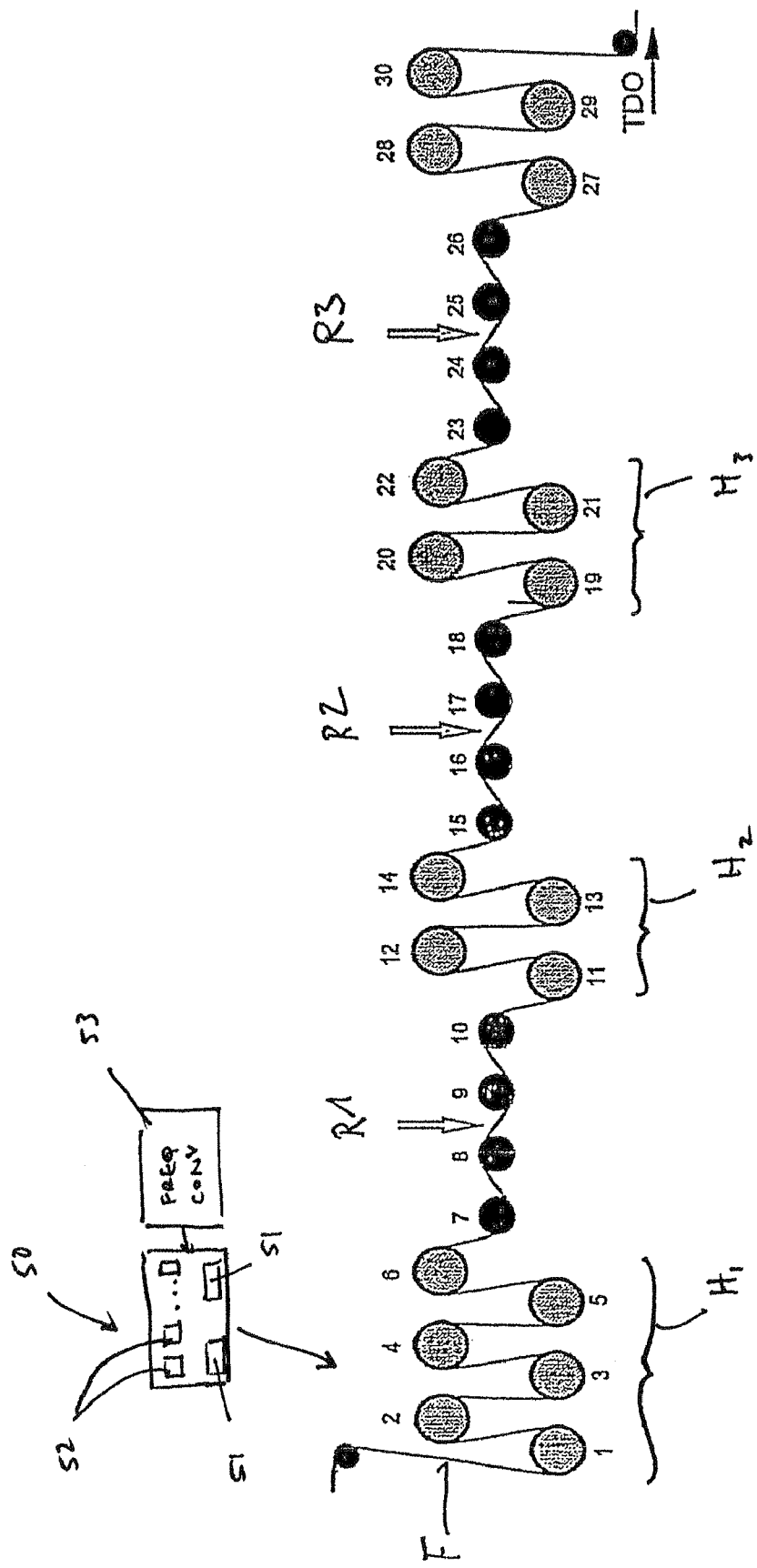
FIG. 1 shows a schematic reproduction of a roll layout of a lengthwise stretching unit, in which the drive device according to the invention may be used.

FIG. 1 shows in a schematic side view a layout of a three-stage lengthwise stretching unit, the individual rolls of the stretching unit being serially numbered by reference numerals 1 to 30. Plastics films which comprise in particular polymer material, such as polypropylene or polyester, can be produced in a unit of this type.

Free-flowing plastics film material issuing from an extruder is transferred via a nozzle, as a rule a wide-slot nozzle, and with the aid of what is known as an air knife, to a chilling roll, so the molten film can then be cooled by being passed through a water bath. The plasticized cooling film is then supplied via a plurality of deflecting rolls for example to the lengthwise stretching unit shown in FIG. 1. After leaving the lengthwise stretching unit the sheet guided therethrough is usually supplied to a further stretching unit, namely what is known as a transverse stretching unit (TDO) to carry out subsequent transverse stretching. Instead of the transverse stretching unit or the lengthwise stretching unit and the transverse stretching unit, it is also possible to use what is known as a simultaneous stretching unit in which lengthwise and transverse stretching take place simultaneously.

In the lengthwise stretching unit the plastics film F is supplied to a preheating or heating stage $H_1$ which in the illustrated embodiment comprises preheating rolls 1 to 6. The plastics film F can be heated in this heating or preheating stage $H_1$ to a temperature required for stretching. Heating can take place in a known manner in this connection, for example by using appropriate preheating chambers, within which hot air is supplied to the film and/or the film is heated with infrared rays or is brought to the desired temperature profile by using other measures. Some or all of the rolls 1 to 6 belonging to this preheating stage $H_1$ may also be provided with an integrated heating device to heat the film from the roll surface according to the angle of warp of the sheet F on the rolls. The sheet F subsequently runs through rolls 7 to 30, lengthwise stretching taking place in the illustrated example in the stretching nips R1, R2 and R3 respectively. Even the rolls 11 to 14 and 19 to 22 located between the individual stretching zones and having a relatively large diameter in the illustrated embodiment can also again be part of a preheating or heating stage $H_2$ and/or $H_3$ in which the film should be brought to a specific temperature profile, as in preheating stage $H_1$.

Heating of the film, which is desired in terms of process engineering, through the rolls 1 to 6 leads to a change in the length of the sheet, for which reason the entry and exit rolls 1 and 6 are each driven by a direct drive 51 (as part of a motor assembly 50 shown schematically in FIG. 1), the speed of the direct drive of the exit roll being set so as to be greater than the speed of the direct drive of the entry roll. In contrast to the illustrated embodiment the entry roll can also consist of the chilling roll on which the molten film issuing from a nozzle is passed through the water bath. In contrast to the entry and exit rolls the rolls 2 to 5 located therebetween each comprise an asynchronous motor 52. The function of these asynchronous motors is to compensate the friction in the bearings and feed heads of the rolls 2 to 5 and to ensure uniform rolling of the sheet over the preheating rolls. For this purpose, all asynchronous motors are jointly operated by a single frequency converter 53. The frequency of the frequency converter is adjusted in this connection such that the asynchronous motors compensate the friction of the preheating rolls and the elongation of the film for a predefined temperature profile of the preheating rolls and a desired conveying speed of the sheet.

FIG. 1A shows a more detailed schematic representation of an exemplary roll. As shown in FIG. 1A, the asynchronous motors 52 are at least partially torque motors with a hollow shaft 56. The torque motors 52 are each directly assembled on a shaft 58 of one of the intermediate rolls. The motors 52 are each assembled via a flange and/or a bracket 60 on the shaft of an intermediate roll.

Figure 2:
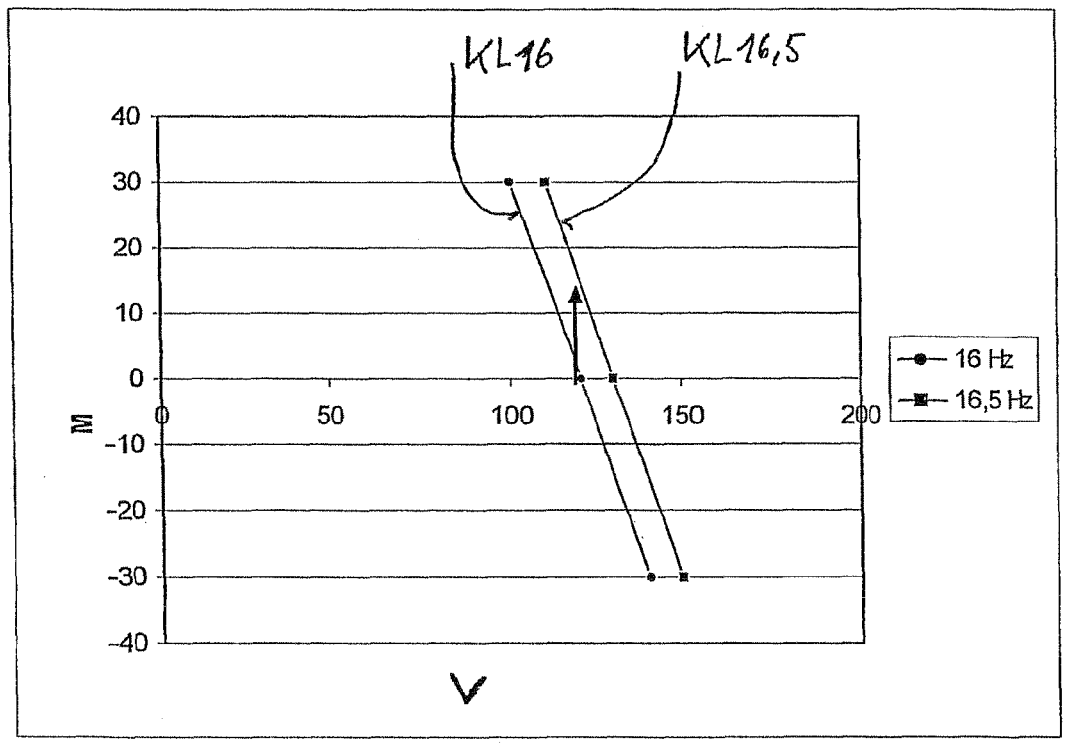
FIG. 2 shows a graph which by way of example shows a characteristic of an asynchronous motor used in the invention.

FIG. 2 shows the characteristic KL16 of the asynchronous motors used in the embodiment described here, the motors being operated by the common frequency converter at a frequency of 16 Hz. The moment M is reproduced on the left-hand vertical axis and the surface speed V on the horizontal axis situated at the bottom. The rolls driven by the asynchronous motors have the same diameter here and hereinafter, so all preheating rolls have the same surface speed, if they rotate at the same speed. The use of preheating rolls with the same diameter is not a requirement of the invention however. In particular, it is also possible for rolls with different diameters to be used, the characteristics of the individual asynchronous motors then being adjusted such that the zero point of the characteristic of all asynchronous motors is at the same surface speed. FIG. 2 shows the dependency of the moment (in Nm) applied by an asynchronous motor on the surface speed of the preheating roll controlled by the asynchronous motor (in revolutions per minute). It may be seen that the zero point of the characteristic is at approx. 120 revolutions per minute. The asynchronous motor does not apply a torque at this speed of the preheating roll. When the speed is reduced a positive moment is produced according to the characteristic, while when the speed is increased a negative moment is applied.

FIG. 2 shows a second characteristic KL16,5 that is displaced to the right of the 16 Hz characteristic KL16 and which corresponds to a drive frequency of 16.5 Hz. In particular, if the speed of the film to be driven cannot be changed and a corresponding torque is nevertheless to be transmitted to the film to compensate the friction, the frequency can be increased accordingly, in order, for example, to apply a greater torque. An increase in the frequency from 16 Hz to 16.5 Hz for example brings about a moment increase of 15 Nm corresponding to the arrow shown.

Heating the film brings about changes in length in the preheating rolls at the end of the preheating zone and this causes the rolls at the end of the preheating zone to rotate faster. According to the characteristic shown in FIG. 2, the last rolls will then apply less moment than the first rolls. The losses in the overall system are kept low hereby and uniform rolling of the film over the preheating rolls is ensured. The influence of the elongation of the film on the tensile distribution is also very low. According to the characteristic of FIG. 2, an increase in the speed of the rolls by 5% for example causes a change in moment of only about 7.5 Nm, in other words about 25% of the nominal moment of the motor.

The difference in the motor moment and the frictional force determines the "free moment" that is absorbed by the film. A positive "free moment" causes the film force (=tension in the film) upstream of the roll to be greater than that downstream of the roll. The "free moment", therefore, determines the change in force in the film over a roll. The absolute level of the moment is defined only by the entry roll and the exit roll.

Figure 3:
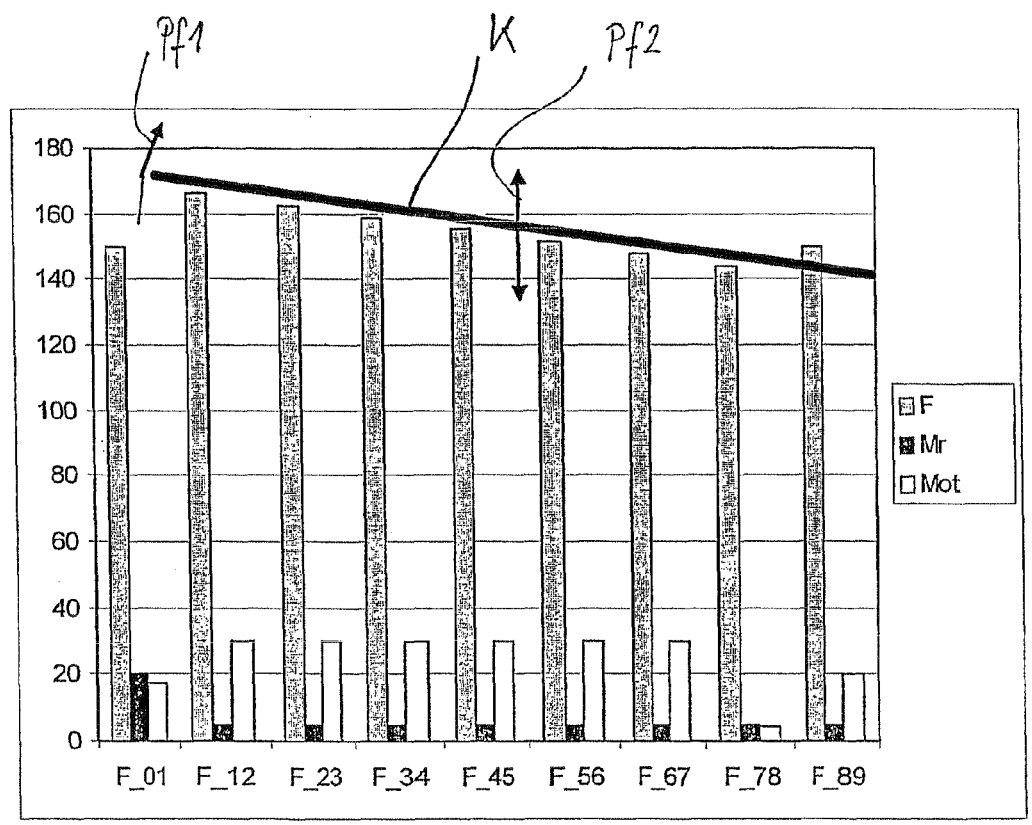
FIG. 3 shows a graph which by way of example shows the force distribution in a preheating roll assembly, of which the rolls are driven by the drive device according to the invention.

FIG. 3 shows the forces acting on the roll assembly for a preheating roll assembly H1 which, in contrast to the embodiments of FIG. 1, comprises not six but a total of nine rolls. The individual rolls are serially numbered from 1 to 9. FIG. 3 makes reference to the rolls shown individually in FIG. 1 which are also serially numbered from 1 to 9 in FIG. 1, the roll number 1 illustrating the entry roll and the roll number 9 illustrating the exit roll of the preheating roll assembly H1. The entry roll and the exit roll are each driven by a direct drive. The rotational speed of the exit roll is adjusted or regulated to a higher rotational speed than the rotational speed of entry roll 0 according to the length of the length of the plastics film in the preheating stage H1. The rolls 1 to 8 located between the entry and exit rolls are driven by asynchronous motors.

Three bars respectively are shown in each of these positions in FIG. 3 and have the following meaning:
  the right-hand bar in each case shows the motor drive force (Mot) of the respective roll 1, 2 . . . to 9,
  the middle bar in each case shows the frictional forces (Mr) of the respective roll 1, 2, . . . to 9, and
  the left-hand bar in each case shows the respective force (F) that acts on the film between two rolls.

The point F_23, therefore, reproduces the motor drive force of roll 3 with the right-hand bar and with the middle bar the frictional force that occurs on the roll 3 and is to also be overcome by the asynchronous motor. The left-hand bar shows the film force that acts on the film between the second and third rolls. In other words, therefore, the motor drive forces acting on the individual preheating rolls 1 to 9 and the occurring frictional forces or the film forces F_12, F_23, F_45, F_67 to F_89 acting between roll 1 and 2, roll 2 and 3, etc. through to the film forces acting between rolls 8 and 9 are in each case shown on the abscissa in FIG. 3. The film force occurring at the first roll of the preheating stage $H_1$ acts between this roll 1 and a roll that precedes the entry roll 1, for which reason this force is designated F_01 in FIG. 3.

The arrow Pf1 in FIG. 3 shows the change in the frequency for the rolls 2 to 7 (or 8) and the arrow Pf2 the change in the friction of the roll 8 with respect to roll 1 (or 2).

As emerges from the characteristic K of the graph in FIG. 3, the film force reduces between roll 2 and the last intermediate roll 8, since the motor force is in each case greater than the frictional force, i.e. the "free moment" is in each case greater than 0, i.e. each of the rolls demands a greater force upstream of the roll than downstream of the roll.

Since the motor moment according to FIG. 2 is directly influenced by the converter frequency, the force distribution in the roll arrangement can be defined by the converter frequency. The mean of the force between roll 1 and roll 9 is furthermore defined by the speed ratio of roll 9 to roll 1.

The embodiment has been described for the case where both the entry and exits rolls 1, 9 for the preheating or heating stage $H_1$ are driven by a separate individual or direct drive, the rolls located therebetween then preferably contributing in the illustrated ways to the overall drive via a type of synchronous motor. By contrast, in a simplified embodiment an individual or direct drive could be associated with only the exit roll 9. The embodiment in which an individual or direct drive is also associated with the entry roll 1 in addition to the exit roll is preferred, however, in order to thereby adjust the rotational speed at the entry roll 1 and at the exit roll 9 differently accordingly.

The embodiment has been described for the case where the heating or preheating stage $H_1$ with the rolls 1 to 9 is arranged downstream of a chilling roll. In principle, an embodiment would also be conceivable in which the chilling roll is used as the single roll to which a plastics film issuing from a slot nozzle is transferred for cooling. In this case the chilling roll would also have an individual or direct drive.

The invention claimed is:

1. A device for driving a preheating roll assembly in a heating or preheating stage of a unit for producing films, the heating or preheating stages comprising a plurality of rolls with an entry roll, an exit roll and a plurality of intermediate rolls arranged between the entry and exit rolls and the device comprising an electrical motor assembly with which the rolls are driven, wherein:
    the motor assembly comprises at least one individual drive that drives at least one of the entry and exit rolls,
    the motor assembly comprises at least one asynchronous motor, each asynchronous motor controlling a surface speed and a torque of one of the intermediate rolls, and
    a common frequency converter is provided with which at least one asynchronous motor is driven, wherein a frequency of the frequency converter is adjusted such that for a predefined temperature profile of the preheating roll assembly and a desired conveying speed of the film a friction of the rolls and elongation of the film are compensated in the preheating assembly.

2. The device as claimed in claim 1, wherein the motor assembly for the entry and exit rolls comprises one individual drive respectively, in the form of a direct drive.

3. The device as claimed in claim 1, wherein the asynchronous motors are at least partially torque motors with a hollow shaft.

4. The device as claimed in claim 3, wherein the torque motors are each directly assembled on a shaft of an intermediate roll.

5. The device as claimed in claim 1, wherein the asynchronous motors are at least partially IEC standard motors.

6. The device as claimed in claim 5, wherein the IEC standard motors are each assembled via a flange and/or a bracket on the shaft of an intermediate roll.

7. The device as claimed in claim 1, wherein during operation the exit roll can be set to a higher surface speed than the entry roll.

8. The device as claimed in claim 1, wherein the entry roll consists of a chilling roll.

9. The device as claimed in claim 1, wherein the motor assembly comprises two individual drives respectively driving the entry and exit rolls.

10. The device as claimed in claim 1, wherein all asynchronous motors are driven with the common frequency converter.

11. A device for driving a pre-heating roll assembly in a heating or pre-heating stage of a unit for producing films, the heating or pre-heating stages including a plurality of rolls with an entry roll, an exit roll and a plurality of intermediate rolls arranged between the entry and exit rolls, the driving device comprising:
    at least one individual drive that drives at least one of the entry and exit rolls;
    at least one asynchronous motor that controls a surface speed and a torque of one of the intermediate rolls; and
    a common frequency converter that drives at least one asynchronous motor,
    wherein the at least one individual drive and the at least asynchronous motor are cooperable with the common frequency converter define a motor assembly that drives the pre-heating roll assembly, wherein a frequency of the frequency converter is adjusted such that for a predefined temperature profile of the preheating roll assembly and a desired conveying speed of the film a friction of the rolls and elongation of the film are compensated in the preheating assembly.

* * * * *